(12) United States Patent
Rosa et al.

(10) Patent No.: US 11,032,734 B2
(45) Date of Patent: Jun. 8, 2021

(54) NETWORK CONGESTION CONTROL VIA PAGING PROCEDURES

(71) Applicant: Nokia Solutions and Networks Oy, Espoo (FI)

(72) Inventors: Claudio Rosa, Randers (DK); Tero Henttonen, Espoo (FI); Ejaz Shah, Algonquin, IL (US); Jedrzej Stanczak, Poznan (PL)

(73) Assignee: Nokia Solutions and Networks Oy, Espoo (FI)

( * ) Notice: Subject to any disclaimer, the term of this patent is extended or adjusted under 35 U.S.C. 154(b) by 49 days.

(21) Appl. No.: 15/754,314

(22) PCT Filed: Aug. 17, 2016

(86) PCT No.: PCT/EP2016/069492
§ 371 (c)(1),
(2) Date: Feb. 22, 2018

(87) PCT Pub. No.: WO2017/032660
PCT Pub. Date: Mar. 2, 2017

(65) Prior Publication Data
US 2018/0249367 A1    Aug. 30, 2018

Related U.S. Application Data

(60) Provisional application No. 62/208,956, filed on Aug. 24, 2015.

(51) Int. Cl.
*H04L 12/26* (2006.01)
*H04W 28/02* (2009.01)
(Continued)

(52) U.S. Cl.
CPC ....... *H04W 28/0284* (2013.01); *H04W 28/08* (2013.01); *H04W 28/12* (2013.01); *H04W 48/18* (2013.01)

(58) Field of Classification Search
None
See application file for complete search history.

(56) References Cited

U.S. PATENT DOCUMENTS 9,253,710 B2 *   2/2016   Kim ...................... H04W 48/06
9,288,717 B2 *   3/2016   Jang ..................... H04W 28/08
(Continued)

FOREIGN PATENT DOCUMENTS

CN     101686497 A    3/2010
CN     101951664 A    1/2011
(Continued)

OTHER PUBLICATIONS

"Solution for Multicarrier Load Distribution," Alcatel-Lucent, Alcatel-Lucent Shanghai Bell, 3GPP TSG-RAN WG2 Meeting #90, R2-152635, May 25-29, 2015, Fukuoka, Japan, 3 pgs.
(Continued)

*Primary Examiner* — Phuongchau Ba Nguyen
(74) *Attorney, Agent, or Firm* — Harrington & Smith

(57) ABSTRACT

For a UE in idle mode and camped on a current cell, in response to receiving a paging message indicating the UE should perform a process to select a cell for camping on for idle mode, the following are performed: performing the process to select one of a plurality of cells for camping on for idle mode; and performing operations to camp on the selected cell. The following are performed as part of a continuous load-balancing process for idle-mode load balancing for a cell: determining whether the cell is congested for UEs camping on the cell while in idle mode; and in response to a determination the cell is congested, sending a paging message to idle-mode UE(s) camped on the cell, wherein the paging message is configured to cause the idle-mode UE(s) to start a process to select a cell for camping on for idle mode.

13 Claims, 5 Drawing Sheets

(51) Int. Cl.
H04W 28/08 (2009.01)
H04W 28/12 (2009.01)
H04W 48/18 (2009.01)

(56) References Cited

U.S. PATENT DOCUMENTS

| | | | |
|---|---|---|---|
| 9,370,028 B2* | 6/2016 | Chun | H04W 76/40 |
| 10,595,291 B2 | 3/2020 | Lee et al. | |
| 2010/0291956 A1* | 11/2010 | Iwamura | H04W 48/20 |
| | | | 455/509 |
| 2011/0171951 A1 | 7/2011 | Niu | |
| 2011/0250891 A1 | 10/2011 | Zou et al. | |
| 2011/0274040 A1* | 11/2011 | Pani | H04W 74/006 |
| | | | 370/328 |
| 2012/0289274 A1* | 11/2012 | Matsuo | H04W 48/02 |
| | | | 455/509 |
| 2013/0121225 A1* | 5/2013 | Ryu | H04W 52/0229 |
| | | | 370/311 |
| 2014/0148168 A1* | 5/2014 | Aoyagi | H04W 48/12 |
| | | | 455/436 |
| 2015/0237566 A1* | 8/2015 | Lee | H04W 76/10 |
| | | | 370/230 |
| 2018/0249367 A1 | 8/2018 | Rosa et al. | |

FOREIGN PATENT DOCUMENTS

| | | |
|---|---|---|
| CN | 102939781 A | 2/2013 |
| CN | 106998573 A | 8/2017 |
| CN | 108353320 A | 7/2018 |
| WO | WO-2016/065804 A1 | 5/2016 |

OTHER PUBLICATIONS

"Potential Solution and Analysis for Multicarrier Load Distribution," Intel Corporation, 3GPP TSG-RAN WG2 Meeting #89bis, R2-151185, Apr. 20-24, 2015, Bratislava, Slovakia, 7 pgs.

* cited by examiner

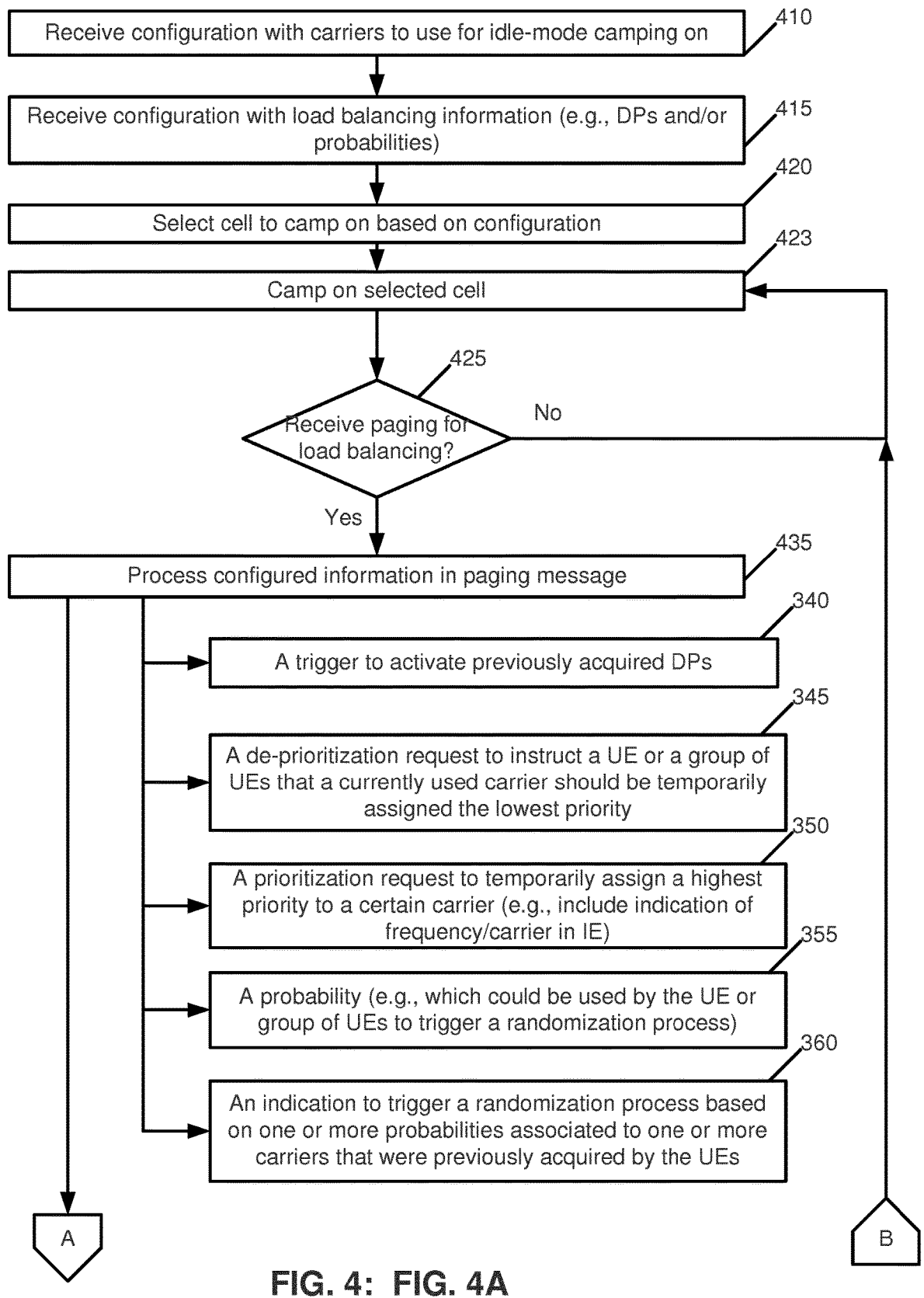
FIG. 4: FIG. 4A

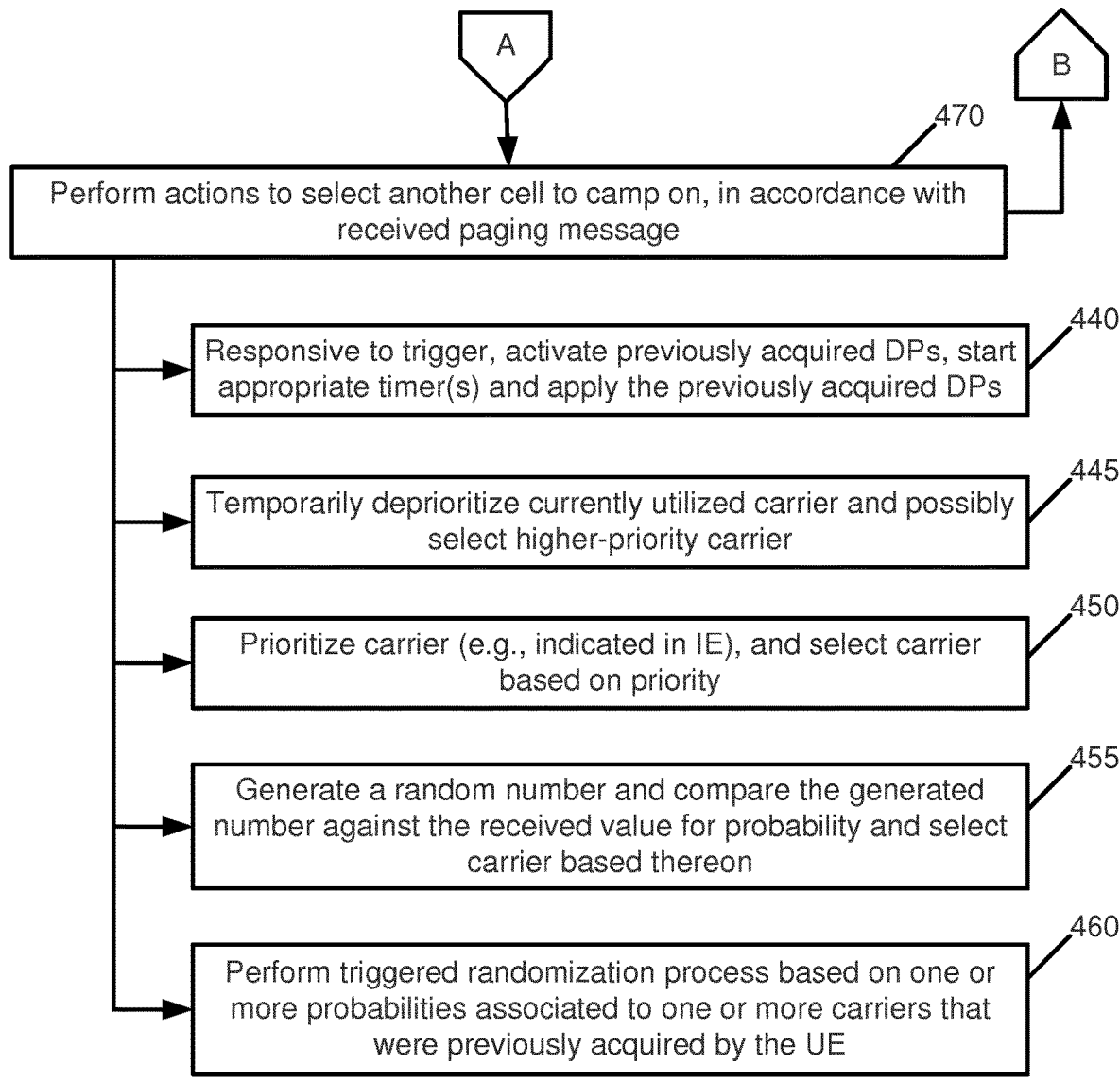
FIG. 4: FIG. 4B

NETWORK CONGESTION CONTROL VIA PAGING PROCEDURES

TECHNICAL FIELD

This invention relates generally to idle-mode traffic steering in wireless networks such as LTE networks and, more specifically, relates to improved load balancing solutions for idle-mode UEs.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be used in the specification and/or drawings are defined below.

Idle-mode load balancing is an active LTE Rel. 13 topic, with a lot of interest from various major operators. The massive growth in data services and devices to support them also demand growth in an operator's network. The number of online gaming applications, real time applications, and the like is growing by the day. That means more and more LTE sites are installed to support the high demand for data. Heterogeneous networks (HetNets) where underlay small cells cover hot spots under overlaid macro cells are becoming very common in urban areas. With such growth also come challenges. For instance, maintaining a well-balanced load among different cells is critical for operators to run their networks smoothly.

Some techniques already exist to tackle idle mode load balancing in previous LTE releases (LTE Rel. 12 and before). However, these techniques are not robust. For example, one such existing technique is redirection of a UE to a different cell at call setup if the cell on which the UE that attempted the call setup is either congested or not optimal for the service the UE is requesting. If the UE has more up to date information, the UE can be camped on a cell that can provide the best service when the UE becomes active. By doing this, there will be less chance of the UE being re-directed to a different cell during call setup. Also, re-directing a UE to a different cell increases signaling during call setup and add delays to the overall call setup procedure.

BRIEF SUMMARY

This section is intended to include examples and is not intended to be limiting.

In an exemplary embodiment, a method is disclosed that comprises: performing at least the following as part of a continuous load-balancing process for idle-mode load balancing for a cell: determining whether the cell is congested for user equipment camping on the cell while in idle mode; and in response to a determination the cell is congested, sending a paging message to one or more idle-mode user equipment camped on the cell, wherein the paging message is configured to cause the one or more idle-mode user equipment to start a process to select a cell for camping on for idle mode.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: performing at least the following as part of a continuous load-balancing process for idle-mode load balancing for a cell: determining whether the cell is congested for user equipment camping on the cell while in idle mode; and in response to a determination the cell is congested, sending a paging message to one or more idle-mode user equipment camped on the cell, wherein the paging message is configured to cause the one or more idle-mode user equipment to start a process to select a cell for camping on for idle mode. A base station may comprise the apparatus of this paragraph.

An exemplary computer program product includes a computer-readable storage medium bearing computer program code embodied therein for use with a computer. The computer program code includes: code for performing at least the following as part of a continuous load-balancing process for idle-mode load balancing for a cell: determining whether the cell is congested for user equipment camping on the cell while in idle mode; and in response to a determination the cell is congested, sending a paging message to one or more idle-mode user equipment camped on the cell, wherein the paging message is configured to cause the one or more idle-mode user equipment to start a process to select a cell for camping on for idle mode.

Another exemplary embodiment is an apparatus, comprising: means for performing at least the following as part of a continuous load-balancing process for idle-mode load balancing for a cell: means for determining whether the cell is congested for user equipment camping on the cell while in idle mode; and means, responsive to a determination the cell is congested, for sending a paging message to one or more idle-mode user equipment camped on the cell, wherein the paging message is configured to cause the one or more idle-mode user equipment to start a process to select a cell for camping on for idle mode. A base station may comprise the apparatus of this paragraph.

In a further exemplary embodiment, a method is disclosed that comprises: for a user equipment in idle mode and camped on a current cell, in response to receiving a paging message indicating the user equipment should perform a process to select a cell for camping on for idle mode, performing the following: performing the process to select one of a plurality of cells for camping on for idle mode; and performing operations to camp on the selected cell.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: for a user equipment in idle mode and camped on a current cell, in response to receiving a paging message indicating the user equipment should perform a process to select a cell for camping on for idle mode, performing the following: performing the process to select one of a plurality of cells for camping on for idle mode; and performing operations to camp on the selected cell. A user equipment may comprise the apparatus of this paragraph.

An exemplary computer program product includes a computer-readable storage medium bearing computer program code embodied therein for use with a computer. The computer program code includes: for a user equipment in idle mode and camped on a current cell, in response to receiving a paging message indicating the user equipment should perform a process to select a cell for camping on for idle mode, code for performing the following: performing the process to select one of a plurality of cells for camping on for idle mode; and performing operations to camp on the selected cell.

In an additional exemplary embodiment, an apparatus for a user equipment in idle mode and camped on a current cell, which in response to receiving a paging message indicating the user equipment should perform a process to select a cell for camping on for idle mode uses means comprising: means for performing the process to select one of a plurality of cells for camping on for idle mode; and means for performing operations to camp on the selected cell. A user equipment may comprise the apparatus of this paragraph.

A communication system is also disclosed that comprises any of the apparatus disclosed herein.

BRIEF DESCRIPTION OF THE DRAWINGS

In the attached Drawing Figures:

FIG. 4, which includes FIGS. 4A and 4B, is a logic flow diagram performed by a user equipment for network congestion control via paging procedures, and illustrates the operation of an exemplary method, a result of execution of computer program instructions embodied on a computer readable memory, functions performed by logic implemented in hardware, and/or interconnected means for performing functions in accordance with exemplary embodiment.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention.

The exemplary embodiments herein describe techniques for network congestion control via paging procedures. Additional description of these techniques is presented after a system is described into which some exemplary embodiments may be used.

Figure 1:
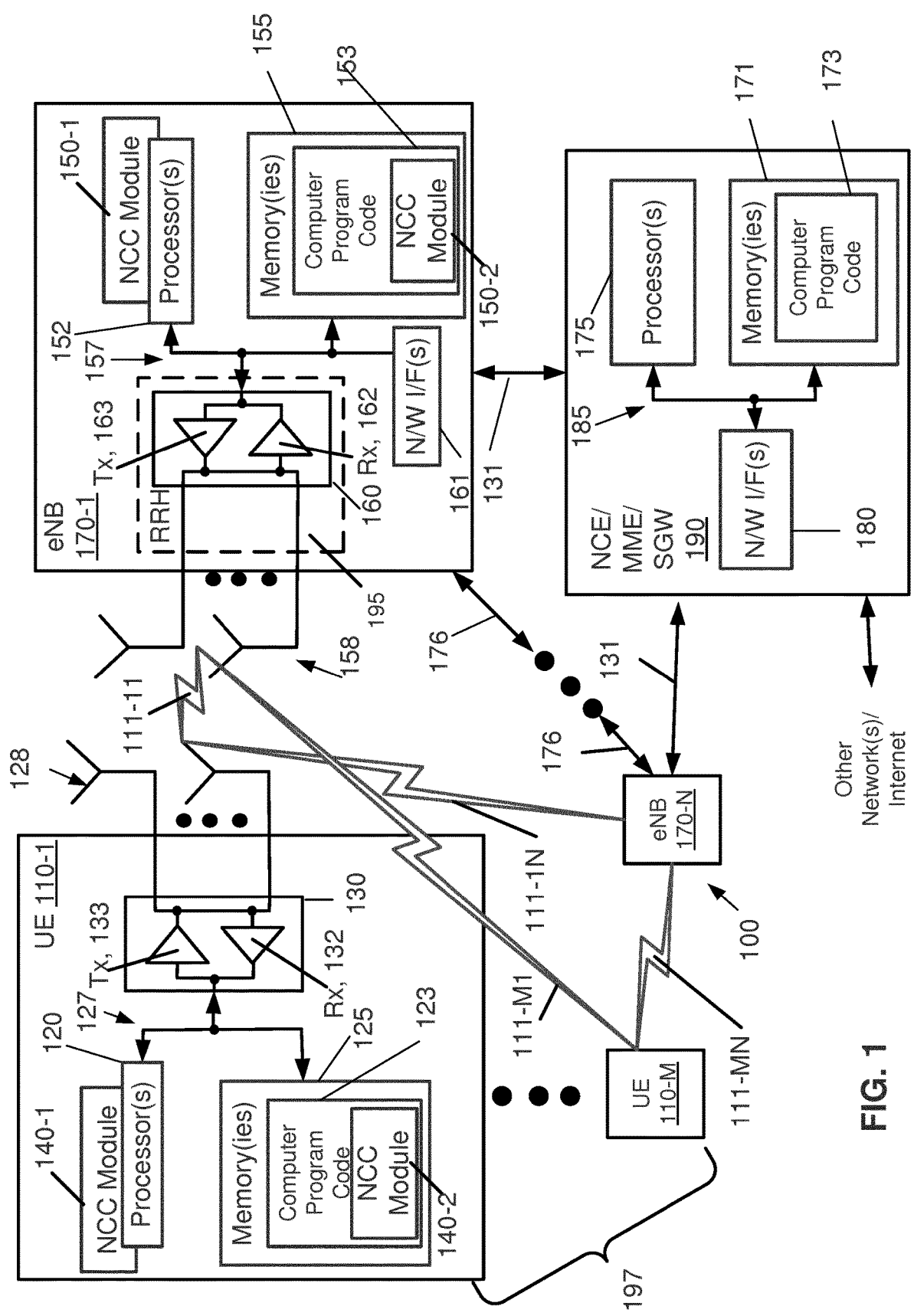
FIG. 1 is a block diagram of an exemplary system in which exemplary embodiments may be practiced.

Turning to FIG. 1, this figure shows a block diagram of an exemplary system in which exemplary embodiments may be practiced. In FIG. 1, M UEs 110-1 through 110-M are in wireless communication with a wireless network 100 and specifically with N eNBs 170-1 through 170-N. Each of the UEs is assumed to be similar, so possible internal configuration of one UE will be described. A user equipment 110 (e.g., 110-1) includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a Network Congestion Control (NCC) module 140, comprising one of or both parts 140-1 and/or 140-2, which may be implemented in a number of ways. The NCC module 140 may be implemented in hardware as NCC module 140-1, such as being implemented as part of the one or more processors 120. The NCC module 140-1 may be implemented also as an integrated circuit or through other hardware such as a programmable gate array. In another example, the NCC module 140 may be implemented as NCC module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein.

Each UE 110 communicates with one or more eNBs 170-1 through 170-N via a corresponding wireless link 111-1 through 111-N. For instance, UE 110-1 communicates with eNBs 170-1 through 170-N via a corresponding wireless link 111-11 through 111-1N, while UE 110-M communicates with one or more eNBs 170-1 through 170-N via a corresponding wireless link 111-M1 through 111-MN. Note that each UE 110 may not actually communicate with each eNB 170.

The eNBs 170-1 through 170-N are expected to be similar. Therefore, only one possible implementation of an eNB will be described in reference to FIG. 1. An eNB 170 (e.g., eNB 170-1) is a base station that provides access by wireless devices such as the UEs 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a Network Congestion Control (NCC) NCC module 150, comprising one of or both parts 150-1 and/or 150-2, which may be implemented in a number of ways. The NCC module 150 may be implemented in hardware as NCC module 150-1, such as being implemented as part of the one or more processors 152. The NCC module 150-1 may be implemented also as an integrated circuit or through other hardware such as a programmable gate array.

In another example, the NCC module 150 may be implemented as NCC module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include a network control element (NCE) 190 that may include MME/SGW functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects. Note that not all (or even no) eNBs 170 need to implement virtualization and thus RRHs 195 might not be used by one or more of the eNBs 170

The UEs 110 may be formed into one or more groups 197. For ease of reference, only one group 197 is illustrated in FIG. 1, and this group 197 contains UEs 110-1 through 110-M. However, the UEs 110-1 through 110-M may be formed into multiple groups 197.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
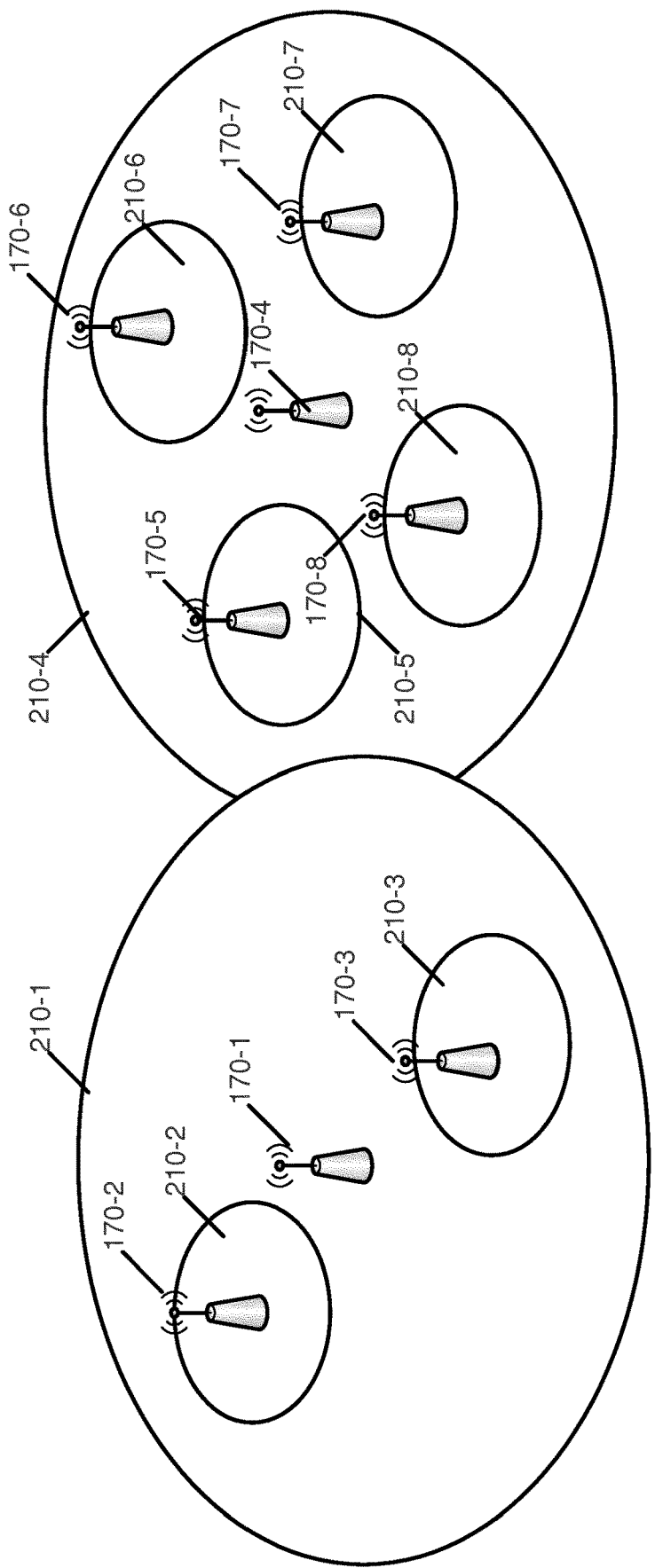
FIG. 2 is an example of a HetNet scenario.

Turning to FIG. 2, this figure is an example of a HetNet scenario. A HetNet scenario is one scenario where the techniques herein may be applied. In this example, there are two macro cells 210-1 and 210-4 (formed by eNBs 170-1 and 170-4, respectively), which overlie a number of underlying cells 210-2, -3, -5, -6, -7, and -8 (formed by eNBs 170-2, -3, -5, -6, -7, and -8, respectively). It is noted that the overlying and underlying cells may also be referred to using other terminology. For instance, overlying cells 210-1 and 210-4 may also be referred to as coverage or candidate cells, while the underlying cells 210-2, -3, -5, -6, -7, and -8 may also be called capacity booster or original cells. It is furthered noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells.

Now that an exemplary system has been described, additional description of problems with conventional load balancing is presented. Currently, idle mode load balancing is performed via cell reselection priorities. There are currently two ways of providing cell reselection priorities to the UEs: Either by broadcast of Absolute Priorities (AP) in System Information, or giving the dedicated priorities (DP) in the RRC message RRCConnectionRelease.

With APs, the UE 110 is instructed in SIB signaling as to which cells to prioritize for reselection in idle mode. This method is applicable to LTE Rel. 8 UEs and beyond. With Dedicated Priorities (DPs), which are provided to a UE during RRC Connection Release (as is known, this is a message sent from the eNB to the UE when UE is supposed to switch from an RRC_CONNECTED state to an RRC_IDLE state) and applied by the UE during idle mode cell selection, the UE applies the priorities for a set amount of time or until the UE moves to the RRC_CONNECTED state again. However, for DP, no mechanism exists which would allow reaching a subset of UEs that are already in idle mode (thus—not reachable via call release in the case of DPs). As a result, the only possibility is to send APs which would be globally acquired by the entire UE population.

A second problem with the dedicated priorities in the existing procedure is that these priorities may be outdated. This means the network (e.g., or one of its carriers) that was congested at the time of UE release may not be congested when the UE attempts to set up a new call some time later (or vice versa). As the network has no control over the time the UE stays idle, there is a good chance that the dedicated priorities sent to the UE as part of call release may be outdated. In such situations, applying dedicated priorities could negatively impact the network operation.

As stated above, the topic of idle load mode balancing has been under discussions in the prior LTE releases. Conventional solutions include cell specific absolute priorities, randomization (nicely summarized in, e.g., R2-151185, "Potential solution and analysis for multicarrier load distribution", Intel Corporation, 3GPP TSG RAN WG2 Meeting #89bis, April 2015), and use of paging for one-off rebalancing (R2-152635, "Solution for multicarrier load distribution", Alcatel-Lucent, 3GPP TSG-RAN WG2 Meeting #90, May 2015).

A cell de-prioritization mechanism was defined in Rel-11, where a UE can be informed via an RRCConnectionReject message that the current frequency or RAT is being deprioritized. This was intended for, e.g., CSFB cases.

Cell-specific priorities can be used to differentiate the priorities between cells operating on the same carrier frequency. It can be of use especially in heterogeneous deployments, but potentially also in situations with unbalanced load between cells operating on the same frequency. However, this solution is not suitable for solving the issue of closely located idle-mode UEs (e.g., almost) simultaneously entering the coverage area of a cell with high priority.

Techniques based on the so-called randomization of frequency and/or cell specific priorities try to solve this problem by associating to a specific cell and/or frequency priority a probability, which an idle-mode UE should take into account. However, solutions based on randomization at the UE present the challenge that an update of the frequency and/or cell specific priority will need to be applied only once by a UE. So some other mechanism to prevent UEs from continuously reapplying the redistribution function with no control from the network side is needed.

Therefore a method based on one-off re-distribution of a fraction of users in a cell using paging mechanism is proposed in R2-152635. The proposed technique there is to provide the one-off prioritization information in the paging message itself. The main limitation of this proposed technique is that indicating which UEs should apply the redistribution can consume a lot of resources from the network, as the amount of data to perform the indicating could be large.

In this disclosure, we propose further enhancements to the conventional techniques, based on a different type of paging mechanism. Specifically, exemplary embodiments herein are aimed at providing additional load balancing capabilities to the network/eNB by utilizing the existing paging procedure. Briefly, the following implementations are possible (and others are described below):

One exemplary implementation is that the paging triggers a group 197 of UEs 110 to start utilizing dedicated priorities (e.g., and potentially associated probabilities) delivered to the UEs by means other than the paging message itself.

As another example, these priorities (e.g., and potentially associated probabilities) may be delivered in either SIB, or earlier in the RRCConnection Release message with an indication that these priorities (e.g., and potentially associated probabilities) are only used (e.g., once) when the paging message is received. That is, there should be an indication (e.g., in RRC Connection Release for DPs or in SIB for APs) that this particular set of priorities should remain inactive until the paging trigger is received.

Alternatively, the paging could be construed as a de-prioritization message, where the UE implicitly deprioritizes the current carrier, e.g., for a set amount of time.

In yet another alternative, the paging message may indicate a different carrier to prioritize over current/other carriers, to move load to that carrier.

In more detail, one idea is to use the existing paging message with additional Information Elements (IEs) to instruct an idle-mode UE 110 or a group 197 of idle-mode UEs 110 on the set of reselection priorities to apply during cell selection. This can be achieved either via a dedicated paging message (i.e., paging a single UE) or a group paging message (i.e. paging a group 197 of UEs).

When the network 100 crosses a congestion threshold, the network can decide to start paging UEs 110 or a group 197 of UEs 110 for the purpose of load balancing. Since the UEs 110 are expected to wake up during their paging interval, a UE 110 shall be able to decode the page, obtain the DP load balancing triggers, and apply the triggers during cell selection. This can especially be beneficial if the UE is being paged (e.g., a mobile terminated call setup) along with congestion control DP triggers during network congestion. Also, using paging to trigger reselection of DPs while the network is congested is more practical as compared to sending DP in an RRC call release procedure, since the network 100 has no control over UE 110 as to when the UE goes from the idle mode to the active mode. By adopting this enhanced paging method, we are eliminating the use of stale DPs for cases when UE stays in idle mode for a much longer time.

Also, not only the activation, but the de-activation of these DP triggers can be controlled via a paging method. As the network load keeps changing with time (e.g., busy hours versus non-busy hours) the need for DPs trigger also keeps changing. This enhanced paging method for congestion control is well adopted with ongoing changes in network load, which prior to these techniques was not possible with the RRC call release procedure. As a matter of fact, applying outdated DPs via RRC call release procedure could negatively impact the network performance.

The following is a list of possibilities on how to notify a UE, or how to activate or de-activate DPs during congestion or if the network is coming out of a congested state. The priorities described below for paging may be considered to be DPs.

a) A paging message may contain just a trigger to activate previously (i.e., in RRC Connection Release) acquired DPs. When the trigger is received, a UE or a group of UEs start appropriate timers and apply the previously acquired DPs.

b) A paging message may contain a de-prioritization request (similar to an RRC Connection Reject message) to instruct a UE or a group of UEs that a currently used carrier should be temporarily assigned the lowest priority. Illustratively, the de-prioritization request is associated with the currently used frequency (or possibly the entire RAT) so the UE knows the UE should temporarily deprioritize the currently utilized carrier (or possibly the entire RAT) (obviously known to the UE).

c) A paging message may contain a prioritization request (e.g., opposite of what has been proposed in subparagraph b) to temporarily assign the highest priority to a certain carrier. A frequency (e.g., which defines a carrier) to be prioritized is not necessarily known to the UE beforehand, as such information may also be delivered to the UE by means of the paging procedure. For instance, a new Information Element (IE) such as "prioritisationTarget-r13 ARFCN-ValueEUTRA" can be used for such purpose.

d) A paging message may contain a probability which could be used by the UE or group of UEs to trigger a randomization process (e.g., deprioritize a currently utilized carrier for a certain time period). This use case is intended to obtain a slightly randomized/unpredictable outcome. As an example, the IE "randomProbability-r13" can be delivered by paging procedure and the IE will contain a percentage value. Upon receiving that, the UE should generate a random number and compare the generated number against the received value for probability. The outcome of such comparison will be, for example, to deprioritize a current frequency or take no action. For instance, if the percentage value is 33 percent (i.e., 0.33), the UE would generate a random number between 0 (zero) and 1.0. If the random number is between 0 (zero) and 0.33, the UE would deprioritize the current frequency; otherwise (the random number between 0.34 and 1.0), the UE would take no action.

e) A paging message may contain an indication to trigger a randomization process based on one or more probabilities associated to one or more carriers that were previously acquired by the UE(s), e.g., via a SIB.

Figure 3:
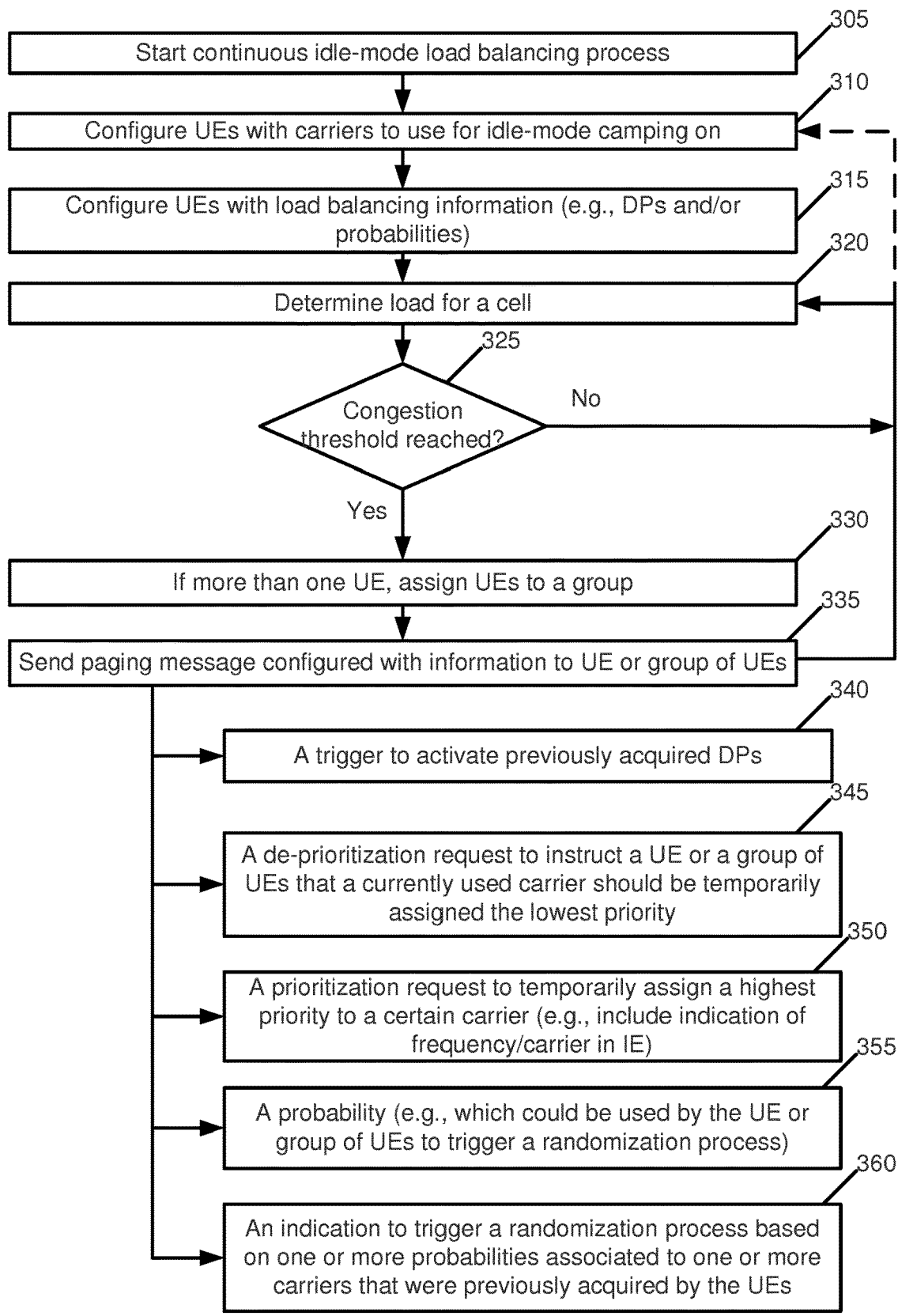
FIG. 3 is a logic flow diagram performed by a base station for network congestion control via paging procedures, and illustrates the operation of an exemplary method, a result of execution of computer program instructions embodied on a computer readable memory, functions performed by logic implemented in hardware, and/or interconnected means for performing functions in accordance with exemplary embodiment.

Turning now to FIG. 3, this figure is a logic flow diagram performed by a base station for network congestion control via paging procedures. This figure also illustrates the operation of an exemplary method, a result of execution of computer program instructions embodied on a computer readable memory, functions performed by logic implemented in hardware, and/or interconnected means for performing functions in accordance with exemplary embodiment. The blocks in FIG. 3 are assumed to be performed by eNB 170, e.g., under control in part by the Network Congestion Control (NCC) module 150.

In block 305, the eNB 170 starts a continuous idle-mode load balancing process. In block 310, the eNB 170 configures UEs 110 with carriers to use for idle-mode camping on. Note that it is assumed that a single carrier is used per cell, and thus an eNB 170 that supports multiple carriers also supports multiple cells. In block 315, the eNB 170 configures UEs 110 with load balancing information. Such information may include one or more of DPs and/or probabilities. Also, as noted above, there could be an indication (e.g., in RRC Connection Release for DPs or in SIB for APs) that this particular set of priorities should remain inactive until the paging trigger is received.

In block 320, the eNB 170 determines load for a cell. The load corresponds to UEs that are in idle mode and camped on the cell. One possibility is for the load to correspond to the UEs which are in idle mode and camped on the cell, and the load can be used only in terms of the number of idle mode UEs. However, the assumption is that the network 100 performs load balancing and the network 100 can take into account more advanced factors (e.g., resource usage, interferences, etc.) for load determination. In block 325, the eNB 170 determines whether a congestion threshold is reached. If the congestion threshold is not reached (block 325=No), the flow continues to block 320. Note that the flow may continue from block 310 (or block 315), e.g., should the eNB 170 also determine to perform other configuration.

If the congestion threshold is reached (block 325=Yes), the flow continues to block 330. In block 330, the eNB 170 determines (based on the load) if more than one UE should be offloaded from the current cell and, if so, assigns multiple UEs to a group 197. One goal is to achieve a state "below the threshold" so in one example, if a threshold is 100 UEs (e.g., using a simple load based on number of UEs) and there are 110 UE, 11 UEs will be instructed to modify/apply their reselection priorities in order to mitigate the load situation.

In block 335, the eNB 170 sends a paging message, configured with information, to the UE or the group of UEs. Examples of configured information in the paging messages are as follows. The paging message is configured to cause the one or more idle-mode UEs 110 to start a process to select a cell for camping on for idle mode. Note that since an idea is to reduce congestion, it is expected that the UEs will select a different cell (rather than the currently camped-on cell) to camp on for idle mode. However, individual UEs, e.g., using a randomization process, may select the currently camped-on cell instead of a different cell, depending on the techniques being used.

In block 340, the configured information may include a trigger to activate previously acquired DPs. Refer also to paragraph a above.

In block 345, the configured information may include a de-prioritization request, which instructs a UE or a group of UEs that a currently used carrier should be temporarily assigned the lowest priority. Refer also to paragraph b above.

In block 350, the configured information may include a prioritization request, which causes the UE to temporarily assign a highest priority to a certain carrier. Refer also to paragraph c above, which further describes that the paging message may include an indication of frequency/carrier in an IE.

In block 355, the configured information may include a probability. The probability could be used by the UE or group of UEs to trigger a randomization process. Refer also to paragraph d above.

In block 360, the configured information may include an indication to trigger a randomization process based on one or more probabilities associated to one or more carriers that were previously acquired by the UEs. Refer also to paragraph e above.

Blocks 335-360 are expected to cause the UE(s) 110 receiving the paging message to consider starting a process to select a (e.g., different) cell on which the UE(s) will camp and potentially to cause the UE(s) 110 to select a different cell.

Referring to FIG. 4, this figure is split into FIGS. 4A and 4B, and contains a logic flow diagram that is shown that is performed by a user equipment for network congestion control via paging procedures. These figures further illustrate the operation of an exemplary method, a result of execution of computer program instructions embodied on a computer readable memory, functions performed by logic implemented in hardware, and/or interconnected means for performing functions in accordance with exemplary embodiment. The blocks in FIG. 4 are assumed to be performed by UE 110, e.g., under control in part by the Network Congestion Control (NCC) module 140.

In block 410, the UE 110 receives configuration with carriers to use for idle-mode camping on. The UE 110, in block 415, receives configuration with load balancing information (e.g., DPs and/or probabilities). Also, as noted above, there could be an indication (e.g., in RRC Connection Release for DPs or in SIB for APs) that this particular set of priorities should remain inactive until the paging trigger is received. In block 420, the UE 110 uses the configuration to select a cell to camp on, and in block 423, the UE 110 camps on the selected cell.

In block 425, the UE 110 determines whether paging (e.g., a paging message) is received for load balancing. If no paging is received (block 425=No), the flow proceeds to block 423 (although the flow may also proceed to block 410 or 415, as described above in reference to FIG. 3).

If paging is received (block 425=Yes), the flow proceeds to block 435, where the configured information in the paging message is processed. This configured information may include the information in blocks 340-360, which have been previously described. The paging message is configured to indicate to the UE 110 that the UE 110 should perform a process to select a cell for camping on for idle mode.

In block 470, the UE 110 performs actions to select another cell to camp on, in accordance with received paging message. Examples of actions that could be performed are as follows.

In block 440, the UE 110, responsive to the trigger in the configured information, starts appropriate timer(s) and applies the previously acquired DPs. The UE 110 will select a carrier based on the timer(s) and DPs. Refer also to block 340 of FIG. 3. As is known, in current implementation there is a timer (denoted as "T320") which controls the validity of DPs. The UE 110 will apply DPs as long as the timer is not expired (the timer is started immediately when UE receives RRC Connection Release with DPs). Once the timer expires, the UE discards the DPs and follows broadcasted APs. In examples in the instant disclosure, the timer is started, provided that a paging trigger is received (so prior to that event, UE/group of UEs follow APs).

In block 445, UE 110, responsive to the de-prioritization request, temporarily deprioritizes a currently utilized carrier and therefore may select higher-priority carrier. Refer also to block 345 of FIG. 3.

In block 450, the UE 110, responsive to the prioritization request, prioritizes a carrier (e.g., indicated in an IE), and selects a carrier based on the current priority. It is noted that de-prioritization does not necessarily imply that a new reselection target carrier will be chosen in a random way. A legacy cell reselection process may be applied (e.g., a carrier with the highest priority is selected). For block 450, refer also to block 350 of FIG. 3.

In block 455, the UE 110, responsive to the probability in the configured information, generates a random number and compares the generated number against the received value for probability and selects a carrier based thereon. In an example, the reception of a paging message with a probability should trigger such random number generation by the UE side and a succeeding comparison process to take a certain action or do nothing (depending on whether the outcome of comparison was 'true' or 'false') should follow. Refer also to block 355 of FIG. 3.

In block 460, the UE 110 responsive to the indication to trigger a randomization process, performs the triggered randomization process based on one or more probabilities associated to one or more carriers that were previously acquired by the UE. This could cause the UE to select another carrier. Additionally, refer to FIG. 3, block 360.

Note also that the indication in RRC Connection Release for dedicated priorities or in SIB for absolute priorities that this corresponding set of priorities should remain inactive until the paging message is received may be used, e.g., in blocks 470 and 440, which could entail activating and using the corresponding set of priorities to select one of multiple cells for camping on for idle mode.

There are several advantages to this enhanced method of load balancing via paging over existing RRC call release procedures. The following is a non-limiting list of potential advantages and their corresponding technical effects:

i) Since this method is adoptive, the DP will always be current.

ii) The issue of applying outdated priorities for congestion control goes away.

iii) The method is flexible and can be applied to individual UEs or a group of UEs.

iv) Existing messaging (i.e., Page) is being used to accomplish idle load balancing instead of introduced new signaling.

v) An existing method of the UE's waking up to check the page is being re-used.

vi) The method can be used to activate, deactivate DPs as network congestion goes through phases.

vii) The method can be used to prioritize one carrier over another.

viii) The method can be used to prioritize a UE or a group of UEs over another.

ix) One (e.g., biggest) advantage will be for the operators to better manage their network and control the network load as desired.

The Following are Examples of Possible Implementations

Example 1

A method, comprising: performing at least the following as part of a continuous load-balancing process for idle-mode load balancing for a cell: determining whether the cell is congested for user equipment camping on the cell while in idle mode; and in response to a determination the cell is congested, sending a paging message to one or more idle-mode user equipment camped on the cell, wherein the paging message is configured to cause the one or more idle-mode user equipment to start a process to select a cell for camping on for idle mode.

Example 2

The method of example 1, wherein the paging message is configured to contain a trigger configured to cause the user equipment to activate previously acquired dedicated priorities.

Example 3

The method of example 1, wherein the paging message is configured to contain a de-prioritization request configured to instruct user equipment that a currently used carrier should be temporarily assigned a lowest priority.

Example 4

The method of example 1, wherein the paging message is configured to contain a prioritization request configured to cause a user equipment to temporarily assign a highest priority to a certain carrier.

Example 5

The method of example 4, wherein the prioritization request is configured using an information element identifying the certain carrier.

Example 6

The method of example 1, wherein the paging message is configured to contain a probability which is used by the user equipment to consider whether to trigger a randomization process for selecting a cell for camping on for idle mode.

Example 7

The method of example 1, wherein the paging message is configured to contain an indication configured to cause the user equipment to trigger a randomization process based on one or more probabilities associated to one or more carriers that were previously acquired by the user equipment.

Example 8

The method of any of examples 1 to 7, wherein the paging message is sent to a single idle-mode user equipment.

Example 9

The method of any of examples 1 to 7, wherein: the method further comprises selecting a group of idle-mode user equipment; and sending further comprises sending the paging message to the group of idle-mode user equipment.

Example 10

The method of example 9, wherein selecting the group is performed so that a number of user equipment in the group is expected to reduce a load on the cell beneath a threshold if all the user equipment in the group select a different cell for camping on for idle mode.

Example 11

The method of any of examples 1 to 10, further comprising sending an indication in RRC Connection Release for dedicated priorities or in SIB for absolute priorities that this corresponding set of priorities should remain inactive until the paging message is received.

Example 12

An apparatus comprising one or more processors one or more memories including computer program code, the one or more memories and the computer program code configured, with the one or more processors, to cause the apparatus to perform the method of any of examples 1 to 11.

Example 13

An apparatus, comprising: means for performing at least the following as part of a continuous load-balancing process for idle-mode load balancing for a cell, the means for performing comprising: means for determining whether the cell is congested for user equipment camping on the cell while in idle mode; and means, responsive to a determination the cell is congested, for sending a paging message to one or more idle-mode user equipment camped on the cell, wherein the paging message is configured to cause the one or more idle-mode user equipment to start a process to select a cell for camping on for idle mode.

Example 14

The apparatus of example 13, wherein the paging message is configured to contain a trigger configured to cause the user equipment to activate previously acquired dedicated priorities.

Example 15

The apparatus of example 13, wherein the paging message is configured to contain a de-prioritization request configured to instruct user equipment that a currently used carrier should be temporarily assigned a lowest priority.

Example 16

The apparatus of example 13, wherein the paging message is configured to contain a prioritization request configured to cause a user equipment to temporarily assign a highest priority to a certain carrier.

Example 17

The apparatus of example 16, wherein the prioritization request is configured using an information element identifying the certain carrier.

Example 18

The apparatus of example 13, wherein the paging message is configured to contain a probability which is used by the user equipment to consider whether to trigger a randomization process for selecting a cell for camping on for idle mode.

Example 19

The apparatus of example 13, wherein the paging message is configured to contain an indication configured to cause the user equipment to trigger a randomization process based on one or more probabilities associated to one or more carriers that were previously acquired by the user equipment.

Example 20

The apparatus of any of examples 13 to 19, wherein the paging message is sent to a single idle-mode user equipment.

Example 21

The apparatus of any of examples 13 to 19, wherein: the apparatus further comprises means for selecting a group of idle-mode user equipment; and the means for sending further comprises means for sending the paging message to the group of idle-mode user equipment.

Example 22

The apparatus of example 21, wherein the means for selecting the group is performed so that a number of user equipment in the group is expected to reduce a load on the cell beneath a threshold if all the user equipment in the group select a different cell for camping on for idle mode.

Example 23

The apparatus of any of examples 13 to 22, further comprising means for sending an indication in RRC Connection Release for dedicated priorities or in SIB for absolute priorities that this corresponding set of priorities should remain inactive until the paging message is received.

Example 24

A method, comprising: for a user equipment in idle mode and camped on a current cell, in response to receiving a paging message indicating the user equipment should perform a process to select a cell for camping on for idle mode, performing the following: performing the process to select one of a plurality of cells for camping on for idle mode; and performing operations to camp on the selected cell.

Example 25

The method of example 24, wherein the paging message is configured to contain a trigger configured to cause the user equipment to activate previously acquired dedicated priorities, and performing the process comprises activating previously acquired DPs, starting one or more timers, and applying the previously acquired DPs based on the one or more timers to select the selected cell.

Example 26

The method of example 24, wherein the paging message is configured to contain a de-prioritization request configured to instruct the user equipment that a currently used carrier should be temporarily assigned a lowest priority, and performing the process further comprises temporarily deprioritizing a currently utilized carrier and selecting a carrier with a higher priority than the currently used carrier, wherein selecting the carrier selects the selected cell.

Example 27

The method of example 24, wherein the paging message is configured to contain a prioritization request configured to cause the user equipment to temporarily assign a highest priority to a certain carrier, and performing further comprises selecting the highest priority carrier, wherein selecting the carrier selects the selected cell.

Example 28

The method of example 27, wherein the prioritization request is configured using an information element identifying the certain carrier.

Example 29

The method of example 24, wherein the paging message is configured to contain a probability, and wherein performing the process further comprises considering, based on the probability, whether to trigger a randomization process for selecting a cell for camping on for idle mode, and in response to determining to trigger the randomization process, triggering the randomization process and using the randomization process to select the selected cell.

Example 30

The method of example 24, wherein the paging message is configured to contain an indication configured to cause the user equipment to trigger a randomization process based on one or more probabilities associated to one or more carriers that were previously acquired by the user equipment, and performing the process further comprises performing the randomization process using the one or more probabilities, to select the selected cell.

Example 31

The method of any of examples 24 to 30, further comprising receiving an indication in RRC Connection Release for dedicated priorities or in SIB for absolute priorities that this corresponding set of priorities should remain inactive until the paging message is received, and wherein performing the process further comprises activating and using the corresponding set of priorities to select one of a plurality of cells for camping on for idle mode.

Example 32

An apparatus for a user equipment in idle mode and camped on a current cell, which in response to receiving a paging message indicating the user equipment should perform a process to select a cell for camping on for idle mode uses means comprising: means for performing the process to select one of a plurality of cells for camping on for idle mode; and means for performing operations to camp on the selected cell.

Example 33

The apparatus of example 32, wherein the paging message is configured to contain a trigger configured to cause the user equipment to activate previously acquired dedicated priorities, and the means for performing the process comprises means for activating previously acquired DPs, means for starting one or more timers, and means for applying the previously acquired DPs based on the one or more timers to select the selected cell.

Example 34

The apparatus of example 32, wherein the paging message is configured to contain a de-prioritization request configured to instruct the user equipment that a currently used carrier should be temporarily assigned a lowest priority, and the means for performing the process further comprises means for temporarily deprioritizing a currently utilized carrier and selecting a carrier with a higher priority than the currently used carrier, wherein the means for selecting the carrier selects the selected cell.

Example 35

The apparatus of example 32, wherein the paging message is configured to contain a prioritization request configured to cause the user equipment to temporarily assign a highest priority to a certain carrier, and the means for performing further comprises means for selecting the highest priority carrier, wherein the means for selecting the carrier selects the selected cell.

Example 36

The apparatus of example 35, wherein the prioritization request is configured using an information element identifying the certain carrier.

Example 37

The apparatus of example 32, wherein the paging message is configured to contain a probability, and wherein the means for performing the process further comprises means for considering, based on the probability, whether to trigger a randomization process for selecting a cell for camping on for idle mode, and means, responsive to determining to trigger the randomization process, for triggering the randomization process and using the randomization process to select the selected cell.

Example 38

The apparatus of example 32, wherein the paging message is configured to contain an indication configured to cause the user equipment to trigger a randomization process based on one or more probabilities associated to one or more carriers that were previously acquired by the user equipment, and the means for performing the process further comprises means for performing the randomization process using the one or more probabilities, to select the selected cell.

Example 39

The apparatus of any of examples 32 to 38, further comprising means for receiving an indication in RRC Connection Release for dedicated priorities or in SIB for absolute priorities that this corresponding set of priorities should remain inactive until the paging message is received, and wherein the means for performing the process further comprises means for activating and using the corresponding set of priorities to select one of a plurality of cells for camping on for idle mode.

Example 40

An apparatus comprising one or more processors one or more memories including computer program code, the one or more memories and the computer program code configured, with the one or more processors, to cause the apparatus to perform the method of any of examples 24 to 31.

Example 41

A communication system comprising the apparatus in accordance with any one of the examples 13 to 23 and the apparatus in accordance with any one of the examples 32 to 39.

Example 42

A computer program comprising program code for executing the method according to any of examples 1 to 11 or 24 to 31.

Example 43

The computer program according to example 42, wherein the computer program is a computer program product comprising a computer-readable medium bearing computer program code embodied therein for use with a computer.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain or store the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:
AP absolute priority
ARFCN absolute radio frequency channel number
CSFB circuit switched fallback
DP dedicated priority
DPs dedicated priorities
eNB or eNodeB evolved Node B (e.g., LTE base station)
EUTRA evolved universal terrestrial radio access
EUTRAN evolved universal terrestrial radio access network
HetNet heterogeneous network
IE information element
LTE long term evolution
NCC network congestion control
NCE network control entity
MME mobility management entity
RAT radio access technology
Rel release
RRC radio resource control
SGW serving gateway
SIB system information block
UE user equipment (e.g., a wireless, portable device)

What is claimed is:

1. A method, comprising:
sending toward one or more idle-mode user equipment camped on a cell an indication in a system information block for a set of priorities that this corresponding set of priorities should remain inactive until a paging message is received; and
sending a paging message toward the one or more idle-mode user equipment camped on the cell, wherein the paging message is configured to cause the one or more idle-mode user equipment to modify, at least using the set of priorities, at least one of current cell selection priorities or current carrier selection priorities and to camp on a cell according to the modification.

2. The method of claim 1, wherein the paging message is configured to contain a trigger configured to cause the user equipment to activate previously acquired dedicated priorities from the set of priorities.

3. The method of claim 1, wherein the paging message is sent to a single idle-mode user equipment.

4. The method of claim 1, wherein:
the method further comprises selecting a group of idle-mode user equipment; and
sending further comprises sending the paging message to the group of idle-mode user equipment.

5. The method of claim 4, wherein selecting the group is performed so that a number of user equipment in the group is expected to reduce a load on the cell beneath a threshold in response to all the user equipment in the group selecting a different cell for camping on for idle mode.

6. A computer program product comprising a non-transitory computer-readable medium bearing program code for executing the method according to claim 1.

7. The method of claim 1, wherein:
the method comprises performing the following, prior to the sending toward the one or more idle-mode user equipment camped on the cell the indication, determining whether the cell is congested for user equipment camping on the cell while in idle mode;
the determining whether the cell is congested, the sending toward the one or more idle-mode user equipment camped on the cell the indication, and the sending the paging message toward the one or more idle-mode user equipment camped on the cell, are performed as part of a continuous load-balancing process for idle-mode load balancing for the cell; and
the sending toward the one or more idle-mode user equipment camped on the cell the indication is performed in response to a determination the cell is congested.

8. A method, comprising:
for a user equipment in idle mode and camped on a current cell, receiving an indication in a system information block for a set of priorities that this corresponding set of priorities should remain inactive until a paging message is received;
receiving the paging message indicating the user equipment should modify at least one of current cell selection priorities or current carrier selection priorities;
modifying, at least using the set of priorities, the at least one of the current cell selection priorities or current carrier selection priorities; and
camping on a selected cell according to the modification.

9. The method of claim 8, wherein the paging message is configured to contain a trigger configured to cause the user equipment to activate previously acquired dedicated priorities from the set of priorities, and comprising activating the previously acquired dedicated priorities, starting one or more timers, and applying the previously acquired dedicated priorities based on the one or more timers to select the selected cell.

10. The method of claim 8, wherein the paging message is configured to contain a probability, and comprising considering, based on the probability, whether to trigger a randomization process for selecting a cell for camping on for idle mode, and in response to determining to trigger the randomization process, triggering the randomization process and using the randomization process to select the selected cell.

11. A computer program product comprising a non-transitory computer-readable medium bearing program code for executing the method according to claim 8.

12. An apparatus comprising:
one or more processors one or more memories including computer program code, the one or more memories and the computer program code configured, with the one or more processors, to cause the apparatus to perform:
for a user equipment in idle mode and camped on a current cell, receiving an indication in a system information block for a set of priorities that this corresponding set of priorities should remain inactive until a paging message is received;
receiving the paging message indicating the user equipment should modify at least one of current cell selection priorities or current carrier selection priorities;
modifying, at least using the set of priorities, the at least one of the current cell selection priorities or current carrier selection priorities; and
camping on a selected cell according to the modification.

13. The apparatus of claim 12, wherein the paging message is configured to contain a trigger configured to cause the user equipment to activate previously acquired dedicated priorities from the set of priorities, and wherein the one or more memories and the computer program code are configured, with the one or more processors, to cause the apparatus to perform the following: activating the previously acquired dedicated priorities, starting one or more timers, and applying the previously acquired dedicated priorities based on the one or more timers to select the selected cell.

\* \* \* \* \*